(12) United States Patent
Rop

(10) Patent No.: US 8,474,261 B2
(45) Date of Patent: Jul. 2, 2013

(54) STEAM GENERATION SYSTEM HAVING A MAIN AND AUXILIARY STEAM GENERATOR

(75) Inventor: Peter Simon Rop, Zoeiermeer (NL)

(73) Assignee: NEM Energy B.V., BN 'S-Gravenhage (NL)

( * ) Notice: Subject to any disclaimer, the term of this patent is extended or adjusted under 35 U.S.C. 154(b) by 294 days.

(21) Appl. No.: 12/988,548

(22) PCT Filed: Apr. 20, 2009

(86) PCT No.: PCT/NL2009/000097
§ 371 (c)(1),
(2), (4) Date: Nov. 4, 2010

(87) PCT Pub. No.: WO2009/131438
PCT Pub. Date: Oct. 29, 2009

(65) Prior Publication Data
US 2011/0036090 A1    Feb. 17, 2011

Related U.S. Application Data

(60) Provisional application No. 61/046,948, filed on Apr. 22, 2008.

(51) Int. Cl.
*B60K 16/00* (2006.01)
*F01K 1/00* (2006.01)
*F01K 13/00* (2006.01)

(52) U.S. Cl.
USPC .............. 60/641.8; 60/641.1; 60/659; 60/676

(58) Field of Classification Search
USPC .................. 60/641.1, 641.8, 39.3, 39.55, 653, 60/676, 646, 657, 39.182
See application file for complete search history.

(56) References Cited

U.S. PATENT DOCUMENTS

| 4,167,856 A | * | 9/1979 | Seidel et al. ............... 60/641.14 |
| 4,320,663 A | * | 3/1982 | Francia ......................... 60/667 |

(Continued)

FOREIGN PATENT DOCUMENTS

| DE | 43 00 192 A1 | 7/1994 |
| DE | 10144841 C1 * | 10/2002 |

(Continued)

OTHER PUBLICATIONS

PCT International Preliminary Report on Patentability and Written Opinion for PCT/NL2009/000097 (Oct. 2010).

(Continued)

*Primary Examiner* — Thomas Denion
*Assistant Examiner* — Laert Dounis

(57) ABSTRACT

A steam generation system comprises a main steam generator and a back-up steam generator (20) which are both in fluid communication with a super heater (3) for superheating the generated steam. The superheater comprises a main heat source (6) for heating up a flow of heating gas. A back-up evaporator (2) is provided as a back-up steam generator for evaporating supplied water into steam. The back-up evaporator is connected in parallel to the main steam generator. An auxiliary heat source is provided for heating up the back-up evaporator. By controlling the auxiliary heat source (9), it is possible to supply more or less heat energy to the back-up evaporator to compensate for fluctuations in steam production of the main steam generator. The back-up evaporator is positioned away from the flow of heating gasses departing from the main heat source.

20 Claims, 5 Drawing Sheets

U.S. PATENT DOCUMENTS 5,444,972 A * 8/1995 Moore .................... 60/39.182
6,279,312 B1 * 8/2001 Hennecke ................. 60/39.3
2006/0174622 A1 8/2006 Skowronski

FOREIGN PATENT DOCUMENTS

DE 101 44 841 B9 10/2004
EP 1 077 312 A1 2/2001

OTHER PUBLICATIONS

Reply to Written Opinion filed with EP Application No. 09736027.5 (Nov. 2010).

* cited by examiner

STEAM GENERATION SYSTEM HAVING A MAIN AND AUXILIARY STEAM GENERATOR

CROSS-REFERENCE TO RELATED APPLICATIONS

This application is the National Stage of International Application No. PCT/NL2009/000097, filed Apr. 20, 2009, which claims the benefit of U.S. Provisional Application No. 61/046,948, filed Apr. 22, 2008, the contents of which is incorporated by reference herein.

FIELD OF THE INVENTION

The present invention relates to a steam generation system comprising a main steam generator having a fluctuating steam production and a back-up steam generator to compensate for fluctuations in the steam production of said main steam generator.

BACKGROUND OF THE INVENTION

EP1.077.312 discloses an apparatus with which it is possible to keep two steam flows originating from two separate combustion processes completely separated until the steam is delivered to a steam turbine. Two sets of heat generation means are fluidly connected to a heat exchanger. Superheating of a steam flow from a first combustion process is being performed externally of the two combustion processes by the heat exchanger.

A problem to this apparatus is that it requires a large steam generation system. The steam generation system has a lot of steam generating means which makes it relatively expensive to build the steam generation system. It is desired to obtain a steam generation system having an improved configuration in that the amount of steam generating means are reduced. A further problem is that the installation is not arranged to be used with a solar energy steam generator.

DE 10144841 discloses a power plant which includes a gas turbine and a steam turbine. The power plant has a steam generator for generating steam which is guided to the steam turbine. The steam generator is provided with a first and second gas conduit which are arranged in parallel. Exhaust gasses from the gas turbine are conducted to the steam generator and distributed over the first and second gas conduit by a gas divider. Each gas conduit of the steam generator is provided with a series of heat exchangers. The first gas conduit comprises a conventional arrangement of heat exchangers including an economiser, evaporizer and superheater to produce a main steam flow. The second gas conduit comprises an economiser, a solar field as an evaporator and a superheater. The solar field is arranged in series with the economiser and the superheater within the second gas conduit.

In operation, the solar field may contribute to the generation of steam. Typically, the evaporation of steam originating from the solar field fluctuates which is caused by changing weather circumstances and day and night differences. By controlling the gas divider to control the amount of gas through the first and second conduit and by controlling a fed water flow which is supplied to the heat exchangers in respectively the first and second gas conduit, it is possible to use available steam generating capacity of the solar field. It is possible to use the steam generating capacity of the solar field to generate steam at a substantively constant temperature to add a generated solar steam flow to the main steam flow originating from the first gas conduit.

The arrangement is controllable to supply steam to the steam turbine at an optimum operating temperature of 500° C.±10K. The temperature is kept substantively constant. The steam turbine converts thermal energy into electricity and has an optimum capacity which depends from the temperature of the steam, but also from the steam mass flow. A problem to the disclosed power plant is that the steam generator generates a variable steam mass flow. The gas turbine is held constant at an optimum capacity to convert thermal energy into electricity. Herewith, the gas turbine generates a constant gas flow of exhaust gasses which are distributed and guided through the first and second gas conduits of the steam generator. When hardly no steam is generated at the solar field the mass flow of generated steam is reduced to the mass flow of the main steam flow generated in the first gas conduit. Due to the fluctuating mass flow, the steam turbine cannot always be fed with at an optimum mass flow. Thus, the steam turbine cannot operate at an optimum capacity. This reduces efficiency and implies for example that invested capital to build the power plant has to be re-earned over a longer term.

Additionally, the disclosed power plant is disadvantageous in that it is a relatively expensive plant to build and service. In fact, the power plant includes two complete steam generators. Furthermore, the power plant includes critical components. A problem to the power plant of DE 10144841 is that it includes a gas divider which is susceptible to damage or provides an unacceptable leakage of gasses. No prior art gas dividers are available which eliminates these problems. A first type of prior art gas dividers is referred as 'Rauchklappe' and includes a large guiding plate. The guiding plate may be positioned into two extreme positions to guide exhaust gasses to a first or second gas conduit. The large guiding plate is not suitable to be accurately positioned in an intermediate position. The large guiding plate would be impaired by vibrations which will damage the gas divider and which will substantively reduce the lifetime.

Problems of leakages will occur if a second type, including so called Louvre elements, of prior art gas dividers is used. The second type of gas dividers are provided with a series of elongated guiding plates which are arranged in parallel. Throughflows are provided in between the guiding plates which can be closed by rotating the guiding plates about their longitudinal axis. A problem to the second type of gas dividers is that these type of gas dividers is not suitable to resist a violent hot flow of exhaust gasses originating from a gas turbine. The elongated guiding plates will deform which will disable a necessary closure. Leakages will occur, which will impair the performances of the gas divider.

DE4300192 discloses an installation for the production of steam out of two combustion processes including an industrial combustion process providing a fluctuating heat as a first process. The installation comprises a gas turbine as a second stable combustion process. A problem to the installation is that the installation requires additional devices like high and low pressure boilers which makes the installation relative expensive and too complex. A further problem is that the installation is not arranged to be used with a solar energy steam generator. U.S. Pat. No. 6,279,312 discloses a steam generation system having a solar steam generator and a waste heat boiler. The solar steam generator comprises a solar field and comprises solar units having mirrors which are arranged to catch solar radiation and concentrate the radiation into a tube system which functions as a heat exchanger. Supplied water to the solar field is evaporated into steam and superheated and then used for steam injection purposes. Typically, the steam generating production of the solar fields is fluctuating as a result of changes in weather and of course day and night differences. The complex character of fluctuating irradiated heat and the strong variety in temperature ask for an extra ordinary and flexible technology.

To compensate for the fluctuating steam generating production of the solar fields, the known steam generation system is provided with the conventional waste heat boiler. The conventional waste heat boiler with a heat exchanger and a steam drum is used as an auxiliary steam generator. The conventional boiler comprises three distinguishable in serial arranged heat exchange units. In a first stage water is supplied to the first heat exchange unit known as an economiser, wherein the supplied water is heated from a supply temperature of about 50° C. to an economic process temperature of just under saturation temperature. After the economiser, the water is supplied to an evaporator as the second heat exchange unit. In the evaporator water is evaporated into steam. Finally in a last stage of steam generation the steam from the evaporator is supplied to a super heater for superheating the steam. The three heat exchange units are all positioned within a common gas conduit of the boiler. The gas conduit is arranged to guide a flow of heating gasses which originate from a gas turbine as a main heat source. The three heat exchange units are all heated by the passing heating gas. A back-up firing equipment is provided including a burner which is controlled in such a way that the sum of the steam mass flows measured for the process steam and the injection steam corresponds to the specified overall flow.

In the known steam generation system, the solar field is connected in parallel with the evaporator of the boiler. The evaporator of the boiler serves as a back-up evaporator. Since the evaporator of the boiler is positioned in parallel with the solar field, it is possible to compensate for fluctuations in steam generation production of the solar field. Heating up the evaporator by the controlled burner increases the steam generating production of the back-up evaporator in the waste heat boiler to compensate for a reduction of the steam generating production of the solar field, for example during night or cloudy weather. As a result a steam generation system is provided which may provide at an outlet conduit to the steam turbine a constant steam flow.

A problem to known steam generation systems is that the reduction of steam generating production of the back-up evaporator is limited. The heating of the back-up evaporator is increased or reduced by the controlled burner to compensate for fluctuations in the steam generating production of the solar field. In the conventional boiler, the back-up evaporator is positioned downstream with respect to the flow of heating gasses flowing from the superheater within the gas conduit. The heating gasses from the gas turbine and the controlled burner together heat up the evaporator which results in the generation of steam. During operation, the heating gasses from the gas turbine are always present. The supply of water to the evaporator may be minimized to reduce the generation of steam, but there must always be a minimal flow of water through the evaporator to prevent overheating of evaporator components, like conduits and manifolds. Overheating of the conduits could lead to serious damage and stagnation of the steam generation process. Therefore in known steam generation systems, it is always ascertained that the evaporator within the boiler generates a minimum amount of steam in spite of the fact that the solar field generates already a sufficient amount of steam. As a result, it is impossible to accurately tailor the conventional boiler to the fluctuating steam generation production of the solar field.

SUMMARY OF THE INVENTION

It is an aim of the present invention to overcome at least partially the above-mentioned problems or to provide at least a suitable alternative. In particular the invention aims to provide a steam generation system wherein a main steam generator is combined with a back-up evaporator having an improved efficiency. In particular the invention aims to provide a steam generation system, wherein the back-up evaporator allows an optimal compensation for changes in steam generating production of a solar field as a main steam generator.

This aim is achieved by a steam generation system according to the present invention.

The steam generation system according to the invention comprises a main steam generator and a back-up steam generator which are both in fluid communication with a super heater for superheating the generated steam. The superheater comprises a main heat source for heating up a flow of heating gas. In use the heating gas passes along the superheater for heating up the superheater. A back-up evaporator is provided as a back-up steam generator for evaporating supplied water into steam. The back-up evaporator is connected in parallel to the main steam generator. An auxiliary heat source is provided for heating up the back-up evaporator. Further, a control system is provided for controlling the auxiliary heat source. By controlling the auxiliary heat source, it is possible to supply more or less heat energy to the back-up evaporator to compensate for fluctuations in steam production of the main steam generator.

The main steam generator may be a solar field, geothermal or other type of steam generator having fluctuating steam production. These kinds of main steam generators may be advantageously, because the generation of steam is durable and environment-friendly.

Preferably, a conventional solar field is arranged which catches solar radiation and concentrates the radiation into a tube system. Circulating water in the tube system may be directly evaporated, but it is also possible to heat up a heat carrying medium, e.g. oil with solar energy and transfer the heat energy absorbed via a heat exchanger to water.

The invention is characterized in that the back-up evaporator is positioned away from the flow of heating gasses departing from the main heat source. Herewith, advantageously the steam generation system according to the invention improves the possibility to compensate for the typical fluctuations in steam production of the main steam generator. Due to the positioning of the auxiliary heat source of the back-up evaporator, it is possible to control the steam production generated by the back-up evaporator more accurately. The evaporating process within the evaporator is hardly or not at all exposed to the heating by the main heat source. The main heat source is dedicated to heat up the heating gasses which pass through the super heater and the separate auxiliary heat source is dedicated to heat up the heating gasses which pass through the back-up evaporator. Herewith the heating of the back-up evaporator is separated from the heating of the super heater which allows a more accurate control of the evaporating process within the evaporator over practically the entire production range of steam generation. Advantageously, the heating of the evaporator by the main heat source is limited. Herewith, damage to evaporator components by heating by the main heat source is prevented in circumstances of minimal steam production of the back-up evaporator. Advantageously, a greater reduction of steam production of the back-up evaporator may be provided without negatively influencing the performance of the superheater.

Advantageously, it is now even possible to exclude the back-up evaporator from the steam generation system when a main steam generator generates sufficient steam flow. The steam generating production of the back-up evaporator may be completely reduced when a solar field as a main steam generator performs optimally during daytime.

In a particular embodiment the back-up evaporator is integrated in a back-up heat exchanger. Preferably, the back-up heat exchanger is arranged as a boiler having a combustion burner as a main heat source. The back-up heat exchanger comprises a gas conduit for guiding a flow of heating gas from the main heat source along the super heater to superheat supplied steam. Advantageously, the back-up evaporator is positioned outside the flow of heating gasses departing from the main heat source. Herewith, heating of the back-up evaporator by the main heat source is reduced. The back-up evaporator may be positioned outside the flow of heating gasses by providing a by pass for the flow of heating gasses in the gas conduit. In an alternative embodiment of the back-up heat exchanger, the back-up evaporator may be positioned outside the gas conduit in a separate gas conduit. Herewith, damage to evaporator components by heating by the main heat source is prevented in circumstances of minimal steam flow. Advantageously, a greater reduction of steam generating production of the back-up evaporator is provided.

In a preferred embodiment the back-up evaporator is arranged within the gas conduit together with the super heater. The back-up evaporator is arranged upstream of the super heater with respect to the flow of heating gas through the gas conduit. The direction of flow of heating gas leaving the main heat source is in a direction away from the back-up evaporator to minimize heat transfer to the evaporator. In a particular embodiment of the steam generation system according to the invention the back-up evaporator is arranged in a gas conduit between the main heat source and the auxiliary heat source.

The back-up evaporator is provided with its own auxiliary heat source for heating the evaporator. Preferably the auxiliary heat source is a combustion burner. A control system is provided to control the auxiliary heat source and thus control the steam generating production of the evaporator.

Preferably the heating gasses from the evaporator are guided together with the heating gasses from the main heating source through the gas conduit to a common gas conduit exit or stack. Advantageously, only one fan may be installed to blow the heating gas through the common gas conduit along both the evaporator and the superheater. Herewith a simple and cost efficient design is provided, wherein the back-up evaporator is integrated together with the super heater in a common gas conduit.

In a further preferred embodiment of the steam generation system according to the invention the control system uses an input signal which is based on a measurement of steam flow or steam pressure in a conduit extending from the super heater to the steam turbine. Herewith the control system is based on a measurement at the end of the process of steam generation. The measurement of steam flow or steam pressure is compared with a reference value and feeds back to the control system. The measurement of steam flow or steam pressure indicates an increase or reduction of steam generating production of the main steam generator and serves as an input to respectively reduce or increase the supply of water to the back-up evaporator and to control the auxiliary heat source.

In a particular embodiment the steam generation system according to invention may further be provided with a feed forward control system. This feed forward control system uses an input signal which is based on a measurement of waterflow in a conduit extending to the back-up evaporator or main steam generator. Advantageously this results in a more precise control of the complete steam generation system, because a waterflow can be measured more accurately than a steam flow.

In a further preferred embodiment of the steam generation system according to the invention an economiser is provided to heat up water from a supply temperature, e.g. ambient temperature to an economic temperature to start the steam generating process. Preferably the economiser is integrated together with the superheater in the gas conduit of the back-up heat exchanger. Herewith thermal energy may optimally be transferred from the heating gasses to the water and steam in the back-up heat exchanger. By integrating an economiser in the gas conduit it is possible to reduce the temperature of the heating gasses from the main heating source from 350° C. to about 90° C. at the conduit exit, thereby limiting heat losses to the environment.

Further the invention relates to a back-up heat exchanger for complementary arrangement to a main heat exchanger like a solar field. The back-up heat exchanger comprises a gas conduit for guiding a flow of heating gas from a main heat source along a super heater to superheat steam. Further the back-up heat exchanger comprises a back-up evaporator for evaporating water into steam. The back-up heat exchanger is provided with an auxiliary heat source for heating the back-up evaporator and a control system for controlling the auxiliary heat source. Herewith the back-up heat exchanger is arranged to compensate for fluctuating steam generating production of a main heat exchanger like a solar field. The back-up heat exchanger according to the invention is characterised in that the back-up evaporator is positioned away from the flow of heating gas departing from the main heat source. Due to the arrangement of the evaporator with respect to the superheater, the evaporator is hardly or not at all heated by the heating gas flowing from the main heat source. Advantageously, a reduction of steam production or an increase of steam production of the main heat exchanger may easily be compensated by respectively heating up or cooling down the back-up evaporator of the back-up heat exchanger without a substantial disturbance of the performance of the superheater. The production of steam by the evaporator may be reduced over a wide range. The evaporator is hardly or not at all exposed to the main heat source, which reduces the risk of overheating the evaporator in a low load situation.

Preferably the back-up heat exchanger is provided with connection points to connect the main heat exchanger in parallel with the back-up evaporator and to an inlet of the super heater.

In a preferred embodiment of the back-up heat exchanger according to the invention both the back-up evaporator as the super heater are arranged within one gas conduit. The gas conduit is arranged to guide the heating gas along the heat exchange units of the evaporator and superheater. Advantageously, only one fan may be provided to blow the heating gas through the gas conduit. The superheater is arranged with a main heat source to heat the super heater to produce superheated steam within the super heater. The back-up evaporator is positioned away from the main heat source such that the back-up evaporator is hardly or not at all heated up by the main heat source. The back-up evaporator is positioned outside the flow of heating gasses originating from the main heat source. The back-up evaporator is provided with a separate auxiliary heat source for heating up the back-up evaporator.

Further the invention relates to a power plant for generating electricity from steam comprising a steam turbine for generating electricity out of steam and a steam generation system according to the invention.

Further preferred embodiments are defined in the sub claims.

BRIEF DESCRIPTION OF THE DRAWINGS

The invention will be explained in more detail with reference to the attached drawings which illustrate a practical embodiment of the invention, what should not be regarded as limiting and in which.

DETAILED DESCRIPTION OF THE INVENTION

Figure 1A:
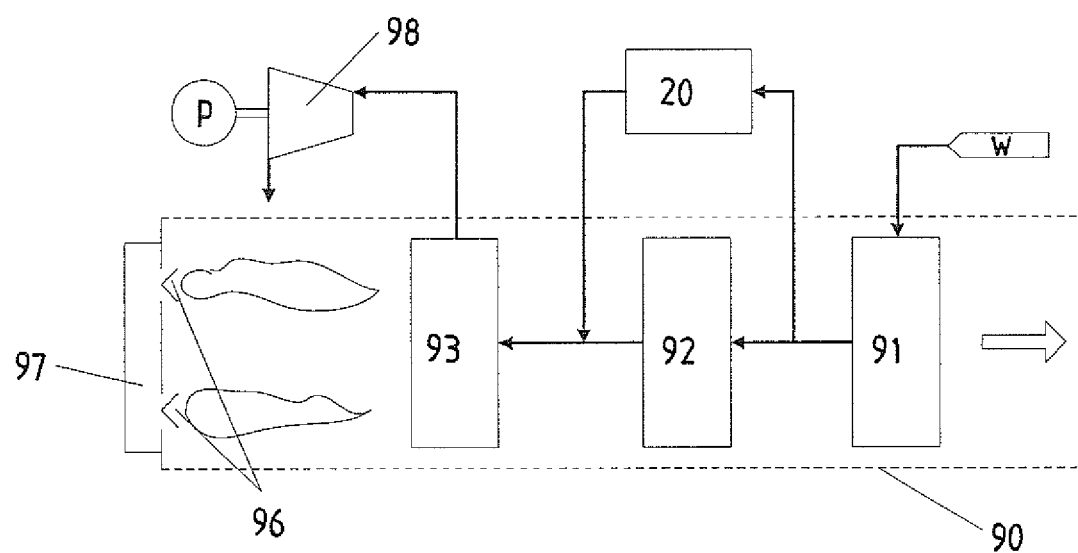
FIG. 1A shows a schematic view of a prior-art steam generation system.

FIG. 1A shows a schematic view of an arrangement of a steam generation system for generation of electricity according to the prior art. The known steam generation system comprises a conventional boiler 90, a solar field 20 as a main heat exchanger and a steam turbine 98. The conventional boiler 90 comprises three different heating stages. In first stage supplied water W is heated to an economic temperature by an economizer 91. Supplied water W is heated from approximately 50° C. to about 330° C. by the economizer 91. After passing the economizer, the waterflow is split up to an evaporator 92 and the solar field 20. Herewith, the solar field 20 is positioned in parallel with the evaporator 92. Both the solar field 20 and the evaporator 92 serve as heat exchangers to evaporate water into steam. The temperature of the steam after passing the evaporator 92 or the solar field 20 is about 330°. In practise the solar field is provided with a tube system having a special coating for an optimal absorption of the solar radiation. Due to its limited heat resistance the coating of the solar field produces steam at a temperature of about 330° C. Before feeding the steam to a steam turbine, it may be superheated by the super heater to a temperature of about 570° C. The steam flow from the solar field 20 and the evaporator 92 is fed to a super heater 93 in a last heating stage. Within the super heater 93 the temperature of the steam increases till 565° Celsius. A main combustion burner 96 is provided at one end of a gas conduit of the boiler 90. The main combustion burner 96 provides the heating energy which is needed to heat up the super heater 93, evaporator 92 and economizer 91. Heating gasses from the combustion burner 96 are blown through the gas conduit by a fan 97 along the three heat exchangers 93, 92, 91 till an open end at the economizer 91. Along the gas conduits the temperature of the heating gasses reduces from 1600° at the combustion burner 96 till about 100° C. at the open end of the gas conduit. The superheated steam leaves the super heater 93 and is fed to a steam turbine 98 to generate power P.

Figure 1B:
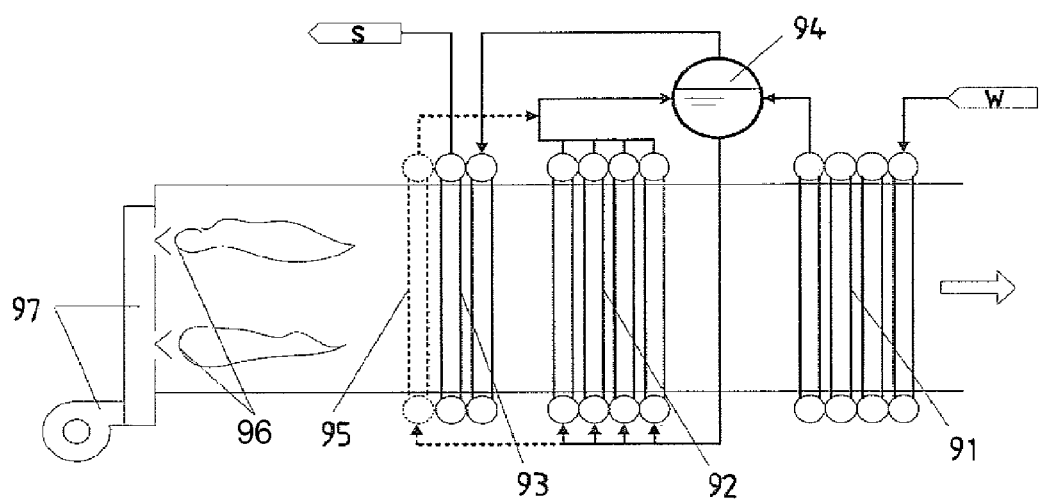
FIG. 1B shows a schematic view of a conventional boiler used in prior-art power plants.

FIG. 1B shows in a schematic view a conventional boiler. The conventional boiler comprises a gas conduit for guiding heating gasses from a main combustion burner 96. The combustion burner 96 is provided at one end of the gas conduit. The combustion burner 96 serves as a main heat source. Heating gasses generated by the combustion burner 96 are forced through the gas conduit by a fan 97. The heating gasses pass several heat exchange units 93, 92, 91 along their way through the gas conduit. An arrow indicates a downstream direction of the heating gasses through the gas conduit. The three heat exchange units are arranged within the gas conduit. Water is supplied to the first heat exchange unit 91 which forms an economizer. The water temperature is increased by the economizer and fed to a drum 94 for buffering and water/steam separation. Water is fed from the drum 94 to an evaporator 92. The evaporator 92 generates a mixture of steam and water which mixture is fed back to the drum 94. Within the drum 94 the steam is separated from the water and fed to a super heater 93. The super heater 93 superheats the supplied steam. The superheated steam is fed to the outlet of the conventional boiler. The super heater 93 is positioned in a position close the main heat source 96. The evaporator 92 and economiser 91 are positioned beside the super heater 93 in a direction downstream the heating gasses. All three heat exchanges are subjected to the heating gasses from the main combustion burner 96. An additional evaporator section 95 may serve as a shield to protect the super heater 93.

Figure 2:
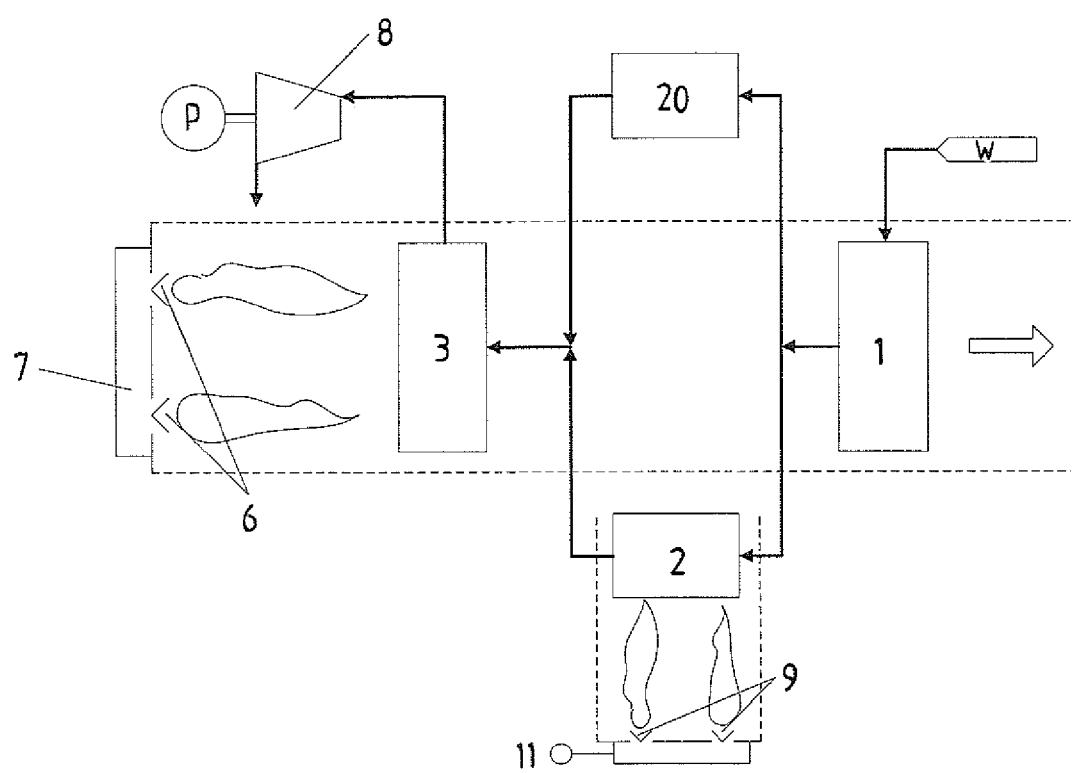
FIG. 2 shows a schematic view of a steam generation system according to the invention.

FIG. 2 shows a schematic view of the steam generation system according to the invention. A solar field 20 is integrated within a circuit of the steam generation system. The steam generation system further comprises an economizer 1 which is connected to a back-up evaporator 2 and a super heater 3. The solar field 20 is connected in parallel with the back-up evaporator 2. An inlet of the solar field 20 is in fluid communication with an outlet of the economizer 1 and an outlet of the solar field 20 is in fluid communication with the super heater 3. Superheated steam from the super heater 3 is fed to a steam turbine 8 to generate power P.

The super heater 3 and the economizer 1 are both heated by a main combustion burner 6. The combustion burner 6 serves as a main heat source. A main stream of heating gasses are forced along the super heater 3 and the economizer 1 by a fan 7. The back-up evaporator 2 is positioned outside this main stream of heating gasses. The back-up evaporator 2 is hardly or not at all subjected to the heating gasses from the main heat source. Hardly any heat is transferred from the heating gasses in the main stream to the back-up evaporator 2. An auxiliary heat source 9 is provided to heat up the back-up evaporator 2. Heating gasses originating from the heat source 9 pass along heat exchange units of the back-up evaporator 2 and heat up the back-up evaporator 2.

The steam generation production of the solar field 20 as main stream generator is typically not constant. Fluctuations in steam generating production are caused by changing in weather and day and night differences. The back-up evaporator 2 according to the invention is designed to compensate for these fluctuations in steam generating production. The back-up evaporator 2 is provided with a separate heat source 9 and a control system 11. The control system 11 controls the amount of heat provided by the heat source 9. When the steam generating production of the solar field 20 reduces, the steam generating production of the back-up evaporator 2 is increased by an increase of the heating gasses generated by the heat source 9. When for example during day and a clear blue sky the heat generating production of the solar field is at a maximum level, than the heat generation production of the back-up evaporator 2 is reduced till a minimum level. Advantageously, the back-up evaporator 2 is positioned outside the main stream of heating gasses from the main heat source 6, which permits to bring the heat generating production of the back-up evaporator 2 till a further minimum level.

Figure 3A:
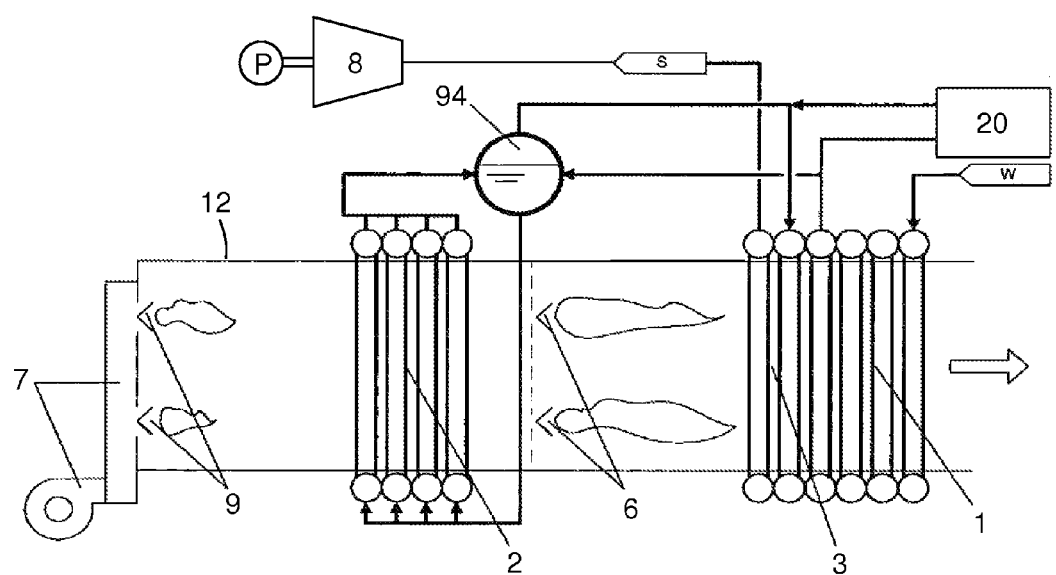
FIG. 3A shows a schematic view of a steam generation system comprising a main steam generator and a back-up heat exchanger according to the invention in a low load situation.

FIG. 3A shows in a schematic view a preferred arrangement of the three heat exchangers as shown in FIG. 2. The three heat exchangers are now arranged within one gas conduit 12. The gas conduit 12 may have an open end, wherein the heating gasses pass from the gas conduit 12 into the open air or stack. A main heat source 6 and an auxiliary controllable heat source 9 are provided within the gas conduit 12. An evaporator 2 is positioned between the main heat source 6 and auxiliary heat source 9. Heating gasses originating from the heat sources are blown away in a direction to the open end of the gas conduit. Herewith the evaporator 2 is substantially heated by the heating gasses departing from the auxiliary heat source 9. The heating gasses heated by the main source 6 flow in a direction away from the evaporator 2. Herewith the evaporator 2 is hardly or not at all exposed to heating by the main heat source, while the superheating performance is still maintained. By controlling the heating gasses from the auxiliary heat source 9, it is possible to control the steam production of the evaporator 2.

In FIG. 3A the auxiliary combustion burners 9 are shown in a low load situation. The generated heat energy by the auxiliary combustion burners 9 is sufficient to keep the evaporator in a hot stand-by modus. Herewith, the evaporator may have a quick response when an increase in steam production is needed. With respect to the heating gasses a super heater 3 and an economizer 1 are arranged downstream of the evaporator 2. As shown in FIG. 2, a solar field 20 is connected in parallel with the back-up evaporator 2. At the end of the circuit superheated steam is fed to a steam turbine 8 to generate power P.

Figure 3B:
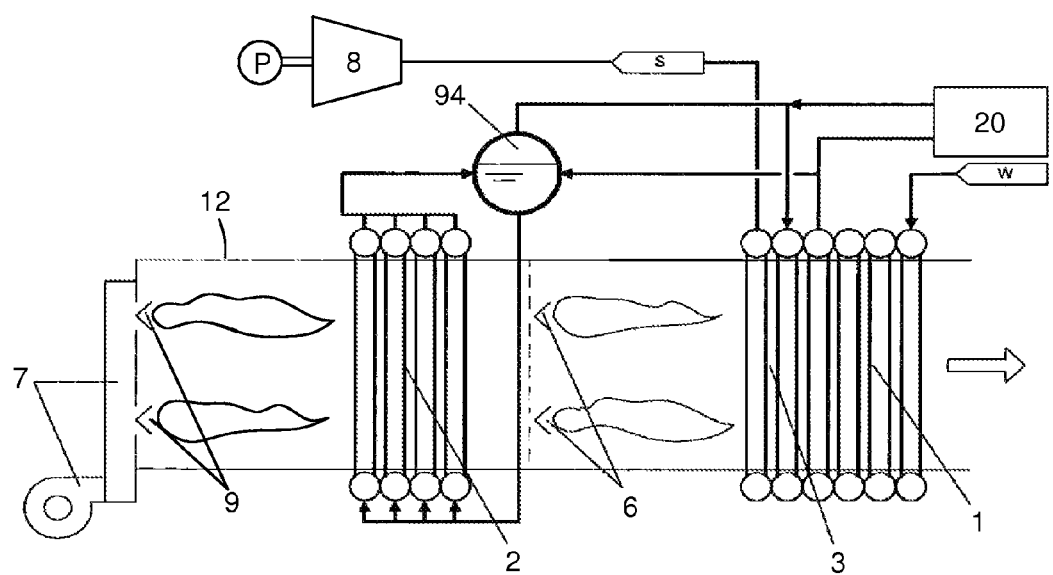
FIG. 3B shows a schematic view of a steam generation system comprising a main steam generator and a back-up heat exchanger according to the invention in high load situation.

FIG. 3B shows the back-up heat exchanger out of FIG. 3A in a situation of high load. In circumstances where the main heat generator 20 does not provide sufficient steam flow, the back-up evaporator 2 has to compensate for this reduction of steam flow. This means an increase of the temperature of heating gasses produced by the auxiliary heat source 9. Increase of a heat production will result in more steam production from the evaporator 2 which compensates for the reduced steam flow from the main heat generator 20. By controlling the heating gasses there may be a constant steam flow at the end of the steam generation system.

Beside the illustrated embodiments of the steam generation system according to the invention, several variations are possible without leaving the scope of protection as defined in the enclosed set of claims. For example, the heating gasses may be produced by a gas turbine as a main heat source. In an alternative embodiment according to the invention, the main steam generator may be formed by a geothermal steam generator, instead of a solar field.

Thus, the steam generation system according to the invention provides a more efficient system. The invention provides a steam generation system which is improved in its capability to compensate for a fluctuating steam production of a main steam generator.

The invention claimed is:

1. A steam generation system comprising:
    a main steam generator having a fluctuating steam production;
    a superheater which comprises a main heat source for heating the superheater by a main stream of heating gasses, in which the main stream of heating gasses is guided by a gas conduit and extends from the main heat source along the superheater to an open end of the gas conduit; and
    a back-up evaporator for evaporating supplied water into steam to compensate for fluctuations in the steam production of said main steam generator, which back-up evaporator is connected in parallel with the main steam generator, in which both said main steam generator and said back-up evaporator are in fluid communication with said superheater for superheating generated steam;
    wherein a separate auxiliary heat source is provided for heating the back-up evaporator by an auxiliary stream of heating gasses and a control system for controlling the auxiliary heat source, wherein the back-up evaporator is positioned outside the main stream of heating gasses.

2. The steam generation system according to claim 1, such that the back-up evaporator is during use only heated by the auxiliary heat source.

3. The steam generation system according to claim 1, wherein the main steam generator is a solar field.

4. The steam generation system according to claim 1, wherein the main heat source is a main combustion burner.

5. The steam generation system according to claim 1, wherein the auxiliary heat source is an auxiliary combustion burner.

6. The steam generation system according to claim 1, wherein the back-up evaporator and auxiliary heat source are positioned outside the gas conduit.

7. The steam generation system according to claim 1, wherein the back-up evaporator, the auxiliary heat source, the superheater, and the main heat source are arranged within one gas conduit, wherein the back-up evaporator is positioned in the gas conduit upstream of the main heat source with respect of the flow direction of the main heating gasses through the gas conduit from the main heat source along the superheater to the open end.

8. The steam generation system according to claim 7, wherein the back-up evaporator is arranged in the gas conduit between the main heat source and the auxiliary heat source.

9. The steam generation system according to claim 1, wherein the control system uses an input signal which is based on a measurement of steam flow or steam pressure in a conduit extending from the superheater to a steam turbine.

10. Steam generation system according to claim 1, wherein the control system uses an input signal which is based on a measurement of waterflow in a conduit extending to the back-up evaporator.

11. The steam generation system according to claim 1, wherein the steam generation system comprises an economizer to heat up supplied water and further cool down the heating gasses.

12. A power plant for generating electricity from steam comprising a steam turbine for generating electricity out of steam and a steam generation system, wherein the steam generation system comprises:
    a main steam generator having a fluctuating steam production;
    a superheater which comprises a main heat source for heating the superheater by a main stream of heating gasses, in which the main stream of heating gasses is guided by a gas conduit and extends from the main heat source along the superheater to an open end of the gas conduit; and
    a back-up evaporator for evaporating supplied water into steam to compensate for fluctuations in the steam production of said main steam generator, which back-up evaporator is connected in parallel with the main steam generator, in which both said main steam generator and said back-up evaporator are in fluid communication with said superheater for superheating generated steam;
    wherein a separate auxiliary heat source is provided for heating the back-up evaporator by an auxiliary stream of heating gasses and a control system for controlling the auxiliary heat source, wherein the back-up evaporator is positioned outside the main stream of heating gasses.

13. A method for compensating for changes in steam generating production of a solar field, comprising:
utilizing the steam generation system according to claim 1.

14. A method for generating steam comprising the steps of:
operating a main steam generator having a fluctuating steam production;
operating a back-up evaporator for evaporating supplied water into steam to compensate for fluctuations in the steam production of said main steam generator, which back-up evaporator is connected in parallel with the main steam generator;
operating a main heat source to heat a superheater by a main stream of heating gasses, in which both said main steam generator and said back-up evaporator provide steam to said superheater to generate superheated steam;
operating an auxiliary heat source to heat the back-up evaporator; and
controlling a control system to control the auxiliary heat source;
wherein the main stream of heating gasses is guided along the superheater in a direction away from the back-up evaporator.

15. The steam generation system according to claim 1, wherein the following elements are disposed within the gas conduit in the following sequence starting at an upstream end of the gas conduit with respect to the main and auxiliary streams of heating gasses, and progressing downstream: the auxiliary heat source, the auxiliary stream of heating gasses, the back-up evaporator, the main heat source, the main stream of heating gasses, and the superheater.

16. The steam generation system according to claim 15, wherein the main steam generator is disposed outside of the gas conduit, and further comprising an economizer in the gas conduit immediately downstream of the superheater with respect to the main stream of heating gasses.

17. The steam generation system according to claim 16, wherein the main steam generator comprises a solar field.

18. The power plant according to claim 12, wherein the following elements are disposed within the gas conduit in the following sequence starting at an upstream end of the gas conduit with respect to the main stream of heating gasses, and progressing downstream: the auxiliary heat source, the auxiliary stream of heating gasses, the back-up evaporator, the main heat source, the main stream of heating gasses, and the superheater.

19. The steam generation system according to claim 18, wherein the main steam generator is disposed outside of the gas conduit, and further comprising an economizer in the gas conduit immediately downstream of the superheater with respect to the main stream of heating gasses.

20. The steam generation system according to claim 19, wherein the main steam generator comprises a solar field.

* * * * *